(12) United States Patent
Lee

(10) Patent No.: US 6,302,447 B1
(45) Date of Patent: Oct. 16, 2001

(54) SELF-LOCKING COUPLING DEVICE

(75) Inventor: Frank Ching King Lee, Hacienda Heights, CA (US)

(73) Assignee: Airdrome Parts Co., Long Beach, CA (US)

( * ) Notice: Subject to any disclaimer, the term of this patent is extended or adjusted under 35 U.S.C. 154(b) by 0 days.

(21) Appl. No.: 09/329,870

(22) Filed: Jun. 11, 1999

(51) Int. Cl.$^7$ .................................................. F16L 15/00
(52) U.S. Cl. .............................. 285/86; 285/315; 285/92; 285/330
(58) Field of Search .............................. 285/86, 92, 315, 285/330

(56) References Cited

U.S. PATENT DOCUMENTS

| | | |
|---|---|---|
| 1,312,584 | 8/1919 | Scott . |
| 2,784,987 | * 3/1957 | Corcoran ............................. 285/315 |
| 4,790,571 | * 12/1988 | Montanari et al. ................... 285/86 |
| 4,995,643 | * 2/1991 | Rappart et al. ...................... 285/86 |
| 5,058,930 | 10/1991 | Schlosser . |
| 5,083,819 | 1/1992 | Bynum . |
| 5,362,110 | 11/1994 | Bynum . |
| 5,586,790 | 12/1996 | Bynum . |
| 5,823,702 | 10/1998 | Bynum . |

FOREIGN PATENT DOCUMENTS

352880 * 12/1937 (IT) ....................................... 285/86

* cited by examiner

Primary Examiner—Teri Pham Luu
(74) Attorney, Agent, or Firm—Fulwider Patton Lee & Utecht, LLP

(57) ABSTRACT

The invention is directed to self-locking coupling devices which are suitable for connecting conduits, pneumatic line segments, hydraulic line segments, fuel line segments or other fluid line segments tubes, ducts, and the like. The self-locking coupling device consists of a first fitting, a second fitting, and a locking sleeve. The first fitting having a first end connect to a first conduit and a second end for receiving a second fitting attached to a second conduit. The first fitting having a coupling portion and a locking portion. The coupling portion formed with an internal thread section. The locking portion having at least one locking tang attached to the coupling portion and extending to the second end of the first fitting. The at least one locking tang formed with an internal locking shoulder projecting radially inwardly at the second end of the first fitting. The second fitting having a first end and a second end. The second fitting formed with an external thread section adjacent to the first end and an annular ridge projecting radially outward adjacent the second end wherein the engagement of corresponding internal and external thread sections causes the at least one locking tang to bend and flex radially thereby allowing the internal locking shoulder to ride up and over the annular ridge. The locking sleeve mounted about the first fitting and being movable between an unlocked position and a locked position.

11 Claims, 4 Drawing Sheets

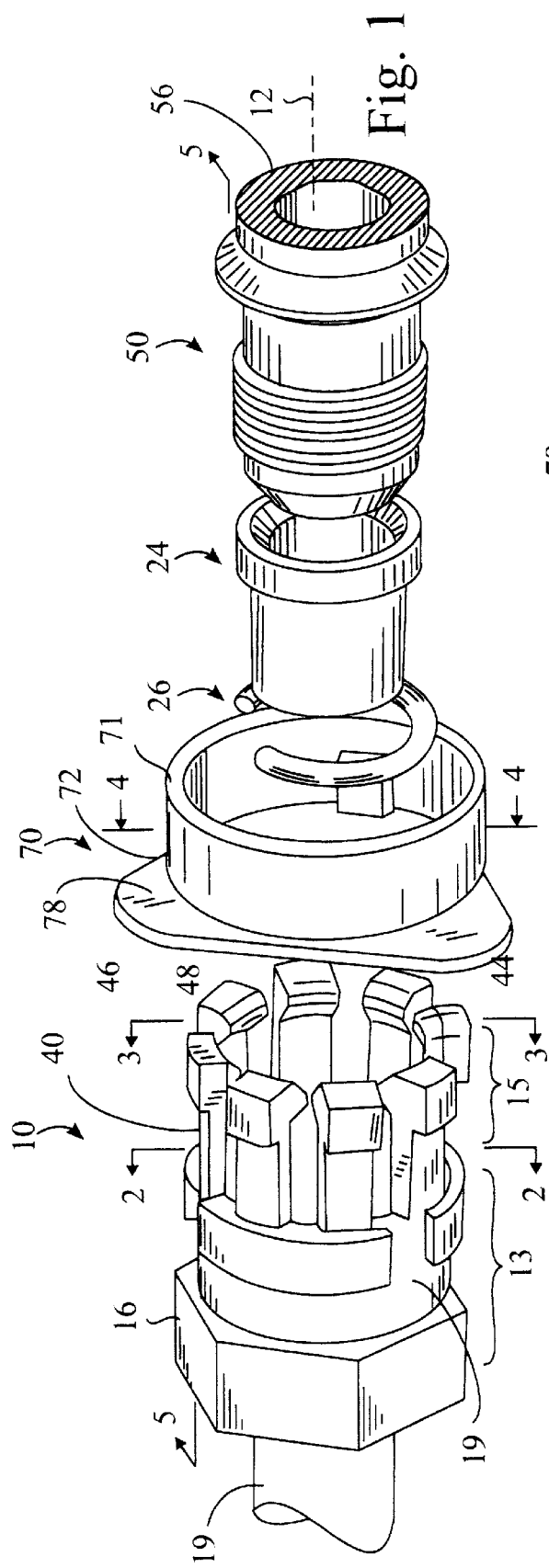
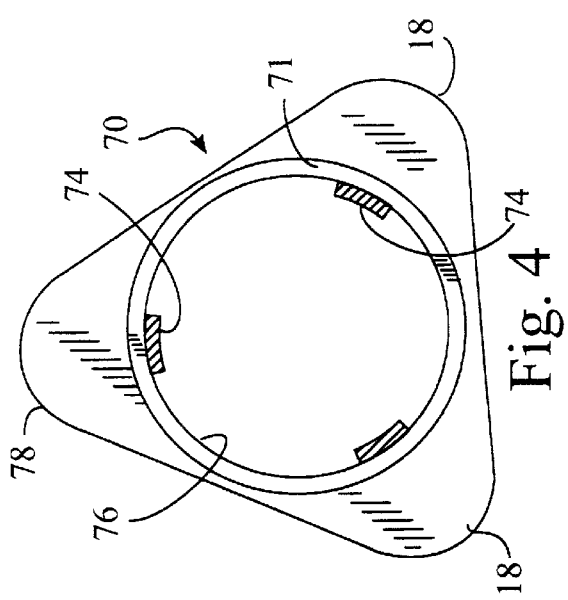
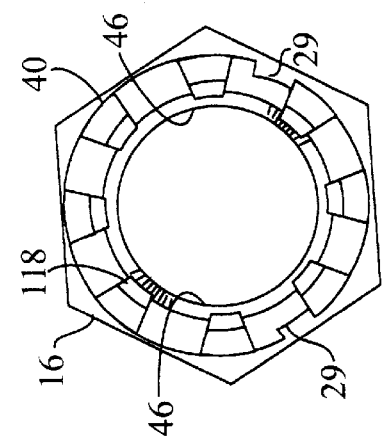
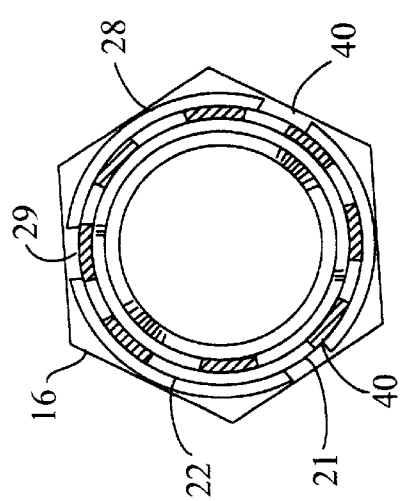

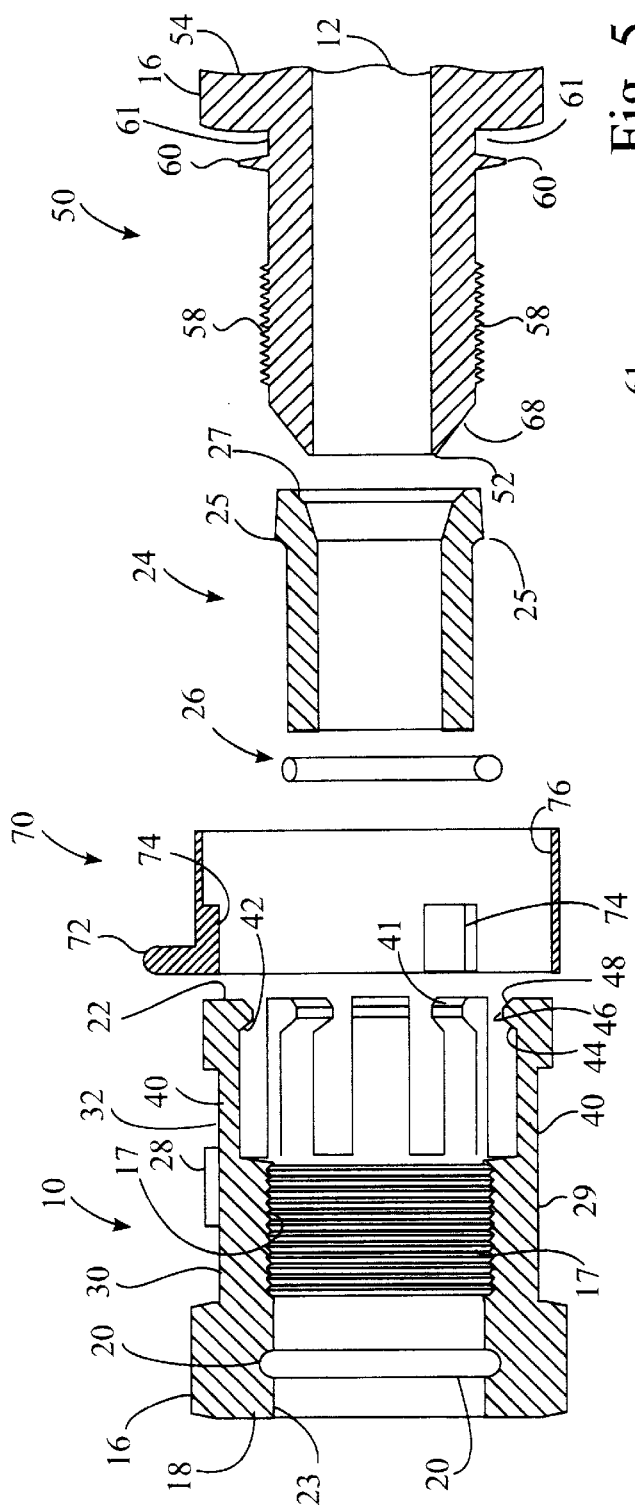
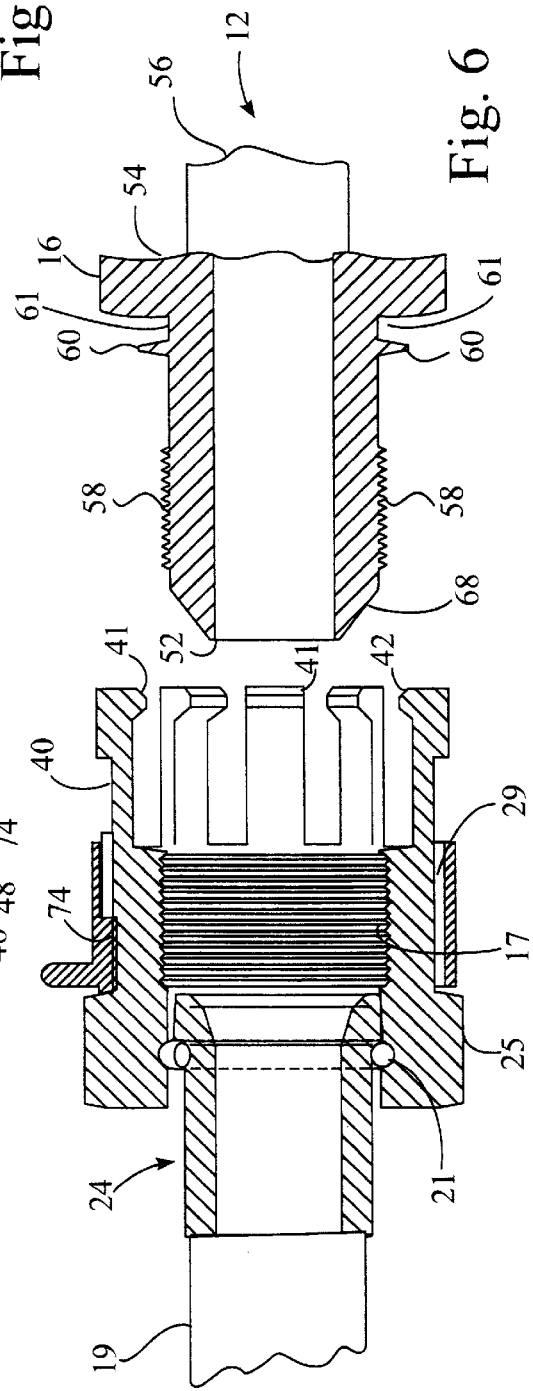
Fig. 5
Fig. 6

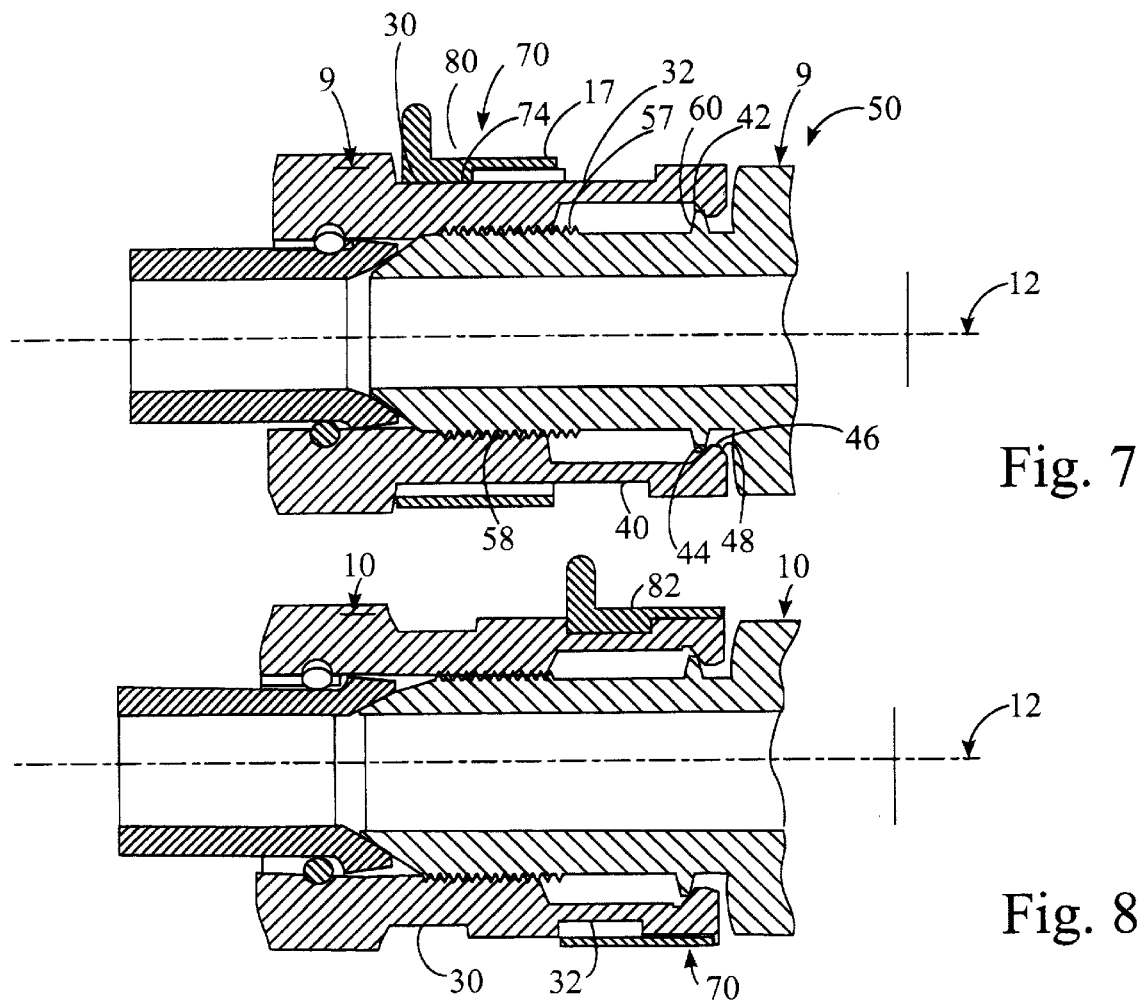
Fig. 7
Fig. 8
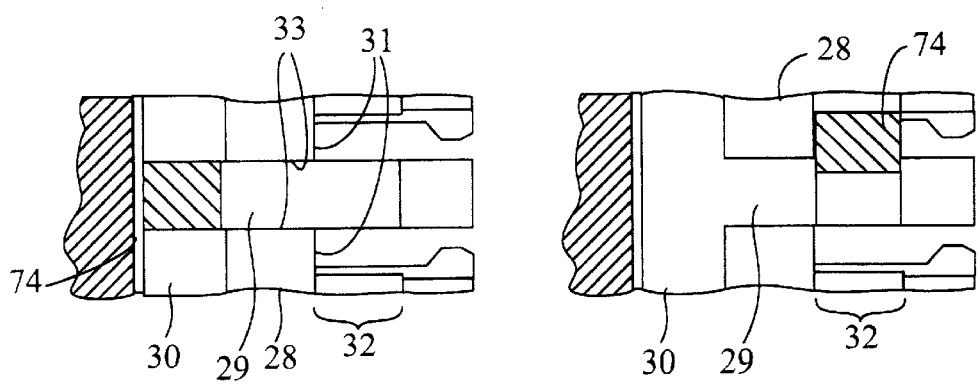
Fig. 9
Fig. 10

SELF-LOCKING COUPLING DEVICE

BACKGROUND OF THE INVENTION

1. Field of the Invention

This invention relates to coupling devices and in particular fluid line coupling devices which are suitable for connecting pneumatic line segments, hydraulic line segments, fuel line segments or other fluid line segments, tubes, ducts, conduits and the like. More specifically, this invention relates to self-locking coupling devices which are designed to prevent inadvertent disassembly and as a result are capable of operating in severe vibrational and thermal cycling environments while maintaining a leak-free fluid connection.

2. Description of the Prior Art

A variety of coupling devices are known in the art for connecting high pressure fluid line segments and the like. Many of these devices have been specifically designed to prevent inadvertent disassembly and catastrophic leakage during operation. These devices include conventional lockwire fluid fittings which consist of threaded fittings coupled together by wired fasteners which prevent the fittings from rotating apart during operation. However, conventional lockwire fluid fittings are labor intensive to install and as a result are not a preferred coupling system where multiple couplings are required in a single installation.

Other prior art devices include for example, U.S. Pat. No. 5,083,819 to Bynum which discloses a threaded fluid coupling equipped with a fastener capture device. The coupling device comprises an internally threaded female fitting formed with external flats about its circumference and an externally threaded male fitting configured with a plurality of tangs mounted above the external threads in a circumferential fashion. Upon engagement of the male and female fittings, the tangs contact the flats with an interference fit and rachet about the junctions between the flats until the fittings are securely coupled. Once coupled, the tangs and the flats cooperate to inhibit rotation of female fitting relative to the male fitting to prevent an inadvertent disassembly of the coupling.

U.S. Pat. No. 5,058,930 to Schlosser discloses a high pressure coupling device consisting of a coupling component with internal threads which engage the external threads of a nipple. The coupling component includes a cylindrical arrangement of cantilevered fingers with bulbous tips at their ends projecting radially inward which, upon engagement of the respective internal and external threads, ride up a frusto-conical ramping surface on the nipple until the tips drop into an annular groove in the nipple wall. Cantilevered forces in the fingers created as the bulbous tips press against the ramping surface act to provide tight engagement of the threads and serve to minimize the effects of vibration thereupon. The bulbous tips seated in the annular groove are intended to prevent a complete disconnecting of the coupling component from the nipple, a separation which would cause a catastrophic leakage at the joint.

Although the above described coupling devices can be used effectively in some applications, these devices lack positive locking features and as a result can be disconnected by simply applying a torsional force to the coupling members sufficient overcome the retaining features which are intended to inhibit relative rotation and prevent disassembly of the coupling.

What is needed and heretofore unavailable is a self-locking coupling device which, once securely coupled, cannot be disconnected regardless of the amount of torsional force applied to the respective coupling members.

SUMMARY OF THE INVENTION

A preferred embodiment of the present invention is directed to a self-locking fluid line coupling device for connecting two coaxial conduits together allowing the flow of fluid therethrough. The self-locking coupling device consists of a first fitting, a second fitting and a locking sleeve mounted about the outer periphery of the first fitting. The self-locking coupling device is designed in such a manner that once the fittings are securely connected, to allow the flow of fluid therethrough, they cannot rotate or translate axially relative to one another. Alternate embodiments of the coupling device of the present invention may be used to join conduits, rods or other bodies together.

The first fitting is formed with a hollow cylindrical body having a coupling portion adjacent a first end and a locking portion adjacent a second end. The coupling portion includes an internal thread section formed about the inner wall of the first fitting. The locking portion includes a plurality of locking tangs attached to the coupling portion extending to the second end of the first fitting. The locking tangs are equally spaced about the axis of the fitting in a cylindrical fashion with radially inward projecting bulbs cooperating to form an internal locking shoulder at the second end. The internal locking shoulder is configured with axially opposed ramping surfaces converging at their most radially inward extremes to form a flat portion.

The first end of the first fitting includes an annular groove recessed into the inner wall for receiving a thrust wire. The annular groove and the thrust wire cooperated to provide a retention ring which captures a ferrule. The ferrule is formed with a hollow cylindrical body having a retention flange at one end. The ferrule extends though the first fitting and attaches to a first conduit such that the retention ring formed about the inner wall of the first fitting and projecting radially inwardly captures the retention flange maintains the ferrule within the first fitting. The outer diameter of the ferrule is sized to closely fit within the inner diameter of the thrust wire. This permits the body of the ferrule to slide though the thrust wire where it is retained by the retention flange. Once the thrust wire is seated against the retention flange the first fitting is free to rotate about the ferrule.

The second fitting is formed with a hollow cylindrical body having a first end and a second end. The first end is configured with a frusto-conical tip designed to engage the corresponding countersunk surface of the ferrule disposed within the first fitting. The second fitting is formed with a external thread section adjacent to the first end to engage the corresponding internal thread section of the first fitting. An annular ridge projecting radially outward is disposed between the external thread section and the second end of the second fitting. Engagement of the corresponding internal and external thread sections advances the first and second fitting together causing the locking tangs to bend and flex radially thereby allowing the internal shoulder to ride up and over the annular ridge.

A locking sleeve is mounted about the exterior of the first fitting and is movable from a unlocked position to a locked position. The locking sleeve being in the unlocked position when it is disposed about the coupling portion of the first fitting whereby the first and second fittings can engage one another to form a coupling allowing fluid flow therethrough. When the first and second fittings are securely coupled together and the internal shoulder is captured behind the annular ridge the locking sleeve is moved to the locked position wherein it is positioned about the locking portion of the first fitting such that the locking sleeve, the internal shoulders on the locking tangs and the annular ridge cooperate to prevent relative rotation and axial translation of the first fitting relative to the second fitting.

The device is designed to positively lock two coaxial conduits together and prevent inadvertent disassembly of the coupling barring a catastrophic failure of the components themselves. As a result, the present invention is capable of operating in severe vibrational and thermal cycling environments while maintaining a leak-free fluid connection. The present invention is also capable of reducing installation time and production cost because design features incorporated into the device provide visible and tactile feedback of correct installation.

Other features and advantages of the present invention will become more apparent from the following detailed description of the invention, when taken in conjunction with the accompanying exemplary drawings.

BRIEF DESCRIPTION OF THE DRAWINGS

FIG. 1 is an exploded view of a self-locking fluid coupling device embodying the present invention;

FIG. 2 is an enlarged cross-sectional view taken along line 2—2 of FIG. 1;

FIG. 3 is an enlarged side view taken along line 3—3 of FIG. 1;

FIG. 4 is an enlarged cross-sectional view taken along line 4—4 of FIG. 1;

FIG. 5 is an enlarged cross-sectional view taken along line 5—5 of FIG. 1;

FIG. 6 is a cross-sectional view of the self-locking device of FIG. 5 shown in assembled form;

FIG. 7 is a cross-sectional view of the self-locking device of FIG. 6 showing the first fitting engaged with the second fitting, the locking sleeve being in the unlocked position;

FIG. 8 is a cross-sectional view of the self-locking device of FIG. 7 showing the locking sleeve in the locked position encompassing the locking portion of the first fitting;

FIG. 9 is a cross-sectional view of the self-locking device of FIG. 7 showing the locking sleeve in the unlocked position with a key being maintained in the first circumferential channel of the first fitting;

FIG. 10 is a cross-sectional view of the self-locking device of FIG. 8 showing the locking sleeve in the locked position with a key being maintained in the second circumferential channel of the first fitting;

DETAILED DESCRIPTION OF THE PREFERRED EMBODIMENTS

Figure 11:
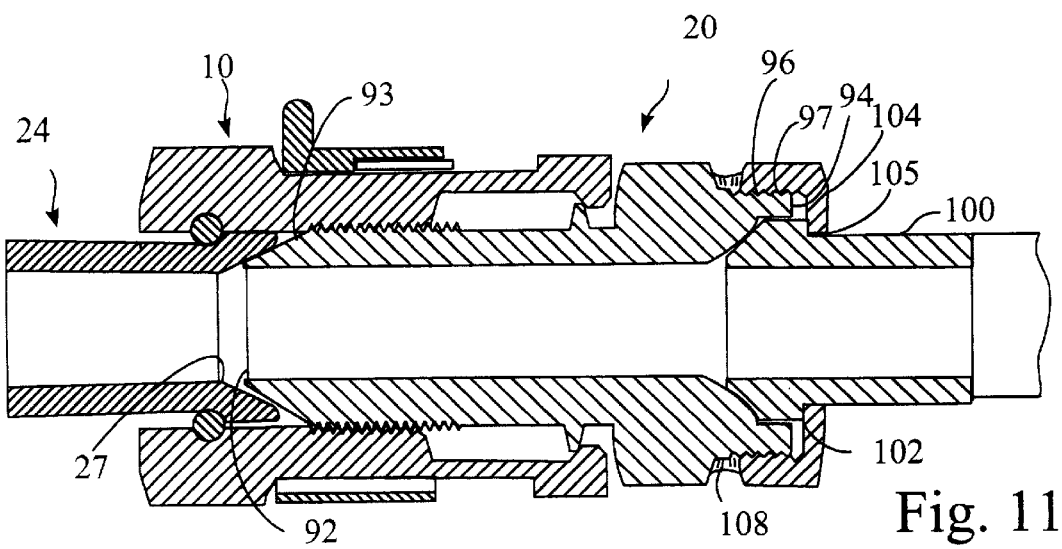
FIG. 11 is a cross-sectional view of an alternate embodiment of the present invention wherein the second fits rotatably mounted about a ferrule.

As shown in FIGS. 1 through 6, a preferred embodiment of the present invention includes first fitting 10, second fitting 50 and locking sleeve 70. The first and second fittings are designed to be joined together in a manner such that once they are securely connected, the respective fittings are prevented from rotating and axially translating relative to one another. Thus, the first and second fittings are securely connected in a manner which prevents unintended or accidental disassembly.

First fitting 10 is formed with a hollow cylindrical body having first end 18 and second end 22. The first end is rotatably connected to first conduit 19 and the second end is capable of receiving second fitting 50 attached to second conduit 21. Locking sleeve 70 is mounted concentrically about external surface of the first fitting.

First fitting 10 is formed with coupling portion 13 adjacent to first end 18 and locking portion 15 adjacent to second end 22. The coupling portion includes internal thread section 17 formed about the inner diameter of the fitting. The locking portion is formed with a plurality of locking tangs 40 which are positioned in front of coupling portion 13 and extend parallel to axis 12 in a cylindrical fashion. Each tang is configured with bulbous tip 41 cooperating to provide internal locking shoulder 42 projecting radially inward at second end 22.

Bulbous tips 41 disposed at the ends of lockings tangs 40 are formed with axially inwardly facing ramping surfaces 44 and axially outwardly facing ramping surfaces 48. The ramping surfaces are axially disposed and project radially inward to converge at their most radially inward extremes to form flat portion 46.

Hex nut 16 adjoins first end 18 of first fitting 10 and includes annular groove 20 located adjacent to first end 18 and recessed into the inner wall 23 of the fitting. The annular groove 20 is configured to receive thrust wire 26. The annular groove and the thrust wire cooperate to provide retention ring 21.

Ferrule 24 is formed with a hollow cylindrical body having retention flange 25 located at one end with internal countersink 27 creating a inverse conical ramping surface. In the present embodiment, as illustrated in FIG. 6, ferrule 24 extends through first fitting 10 and attaches to first conduit 19. The ferrule is disposed within the first fitting such that retention ring 21 projecting radially inwardly captures retention flange 25 and maintains the ferrule within the first fitting. The outer diameter of the ferrule is sized to closely fit within the inner diameter of thrust wire 26. This relationship permits the body of the ferrule to slide through the thrust wire during assembly where the ferrule is finally retained by contact between retention flange 25 and thrust wire 26. Once the thrust wire is seated against the retention flange the first fitting is free to rotate about the ferrule.

Referring to FIG. 5, the outer wall of first fitting 10 includes first circumferential channel 30 adjacent to first end 18 and second circumferential channel 32 adjacent to second end 22 cooperating to define therebetween collar 28. As illustrated in FIGS. 1, 5 and 6, collar 28 is formed with a plurality of axial slots 29 extending therethrough and connecting the first and second circumferential channels.

Referring to FIGS. 1 and 4, locking sleeve 70, formed with a hollow cylindrical body, is mounted concentrically about the exterior of first fitting 10. Locking sleeve 70 includes end flange 72 disposed at one end with a plurality of keys 74 projecting radially inward from inner surface 76. Sleeve portion 71 extends in the forward direction from end flange 72. As illustrated in FIG. 4, the planform of end flange 72 consists of an equilateral triangular shape having generously rounded external corner radii 78, whereby the triangular shape of the end flange provides a gripping feature to aid in the translation and rotation of the locking sleeve about first fitting 10.

Referring to FIGS. 5 and 6, second fitting 50 is formed with a hollow cylindrical body having first end 52 and second end 54. First end 52 is configured with a frusto-conical tip 68 which is designed to engage the inverse conical ramping surfaces of internal countersink 27 formed at the end of ferrule 24 disposed within first fitting 10. Second end 54 of second fitting 50 is attached to second conduit 56. The second fitting is also formed with external thread section 58 adjacent to first end 52 configured to engage corresponding internal thread section 17 of first fitting 10. Annular ridge 60 projecting radially outward is disposed between the external thread section 58 and second end 54.

As illustrated in FIG. 7, engagement of the corresponding internal and external thread sections (17 & 58) advances the first and second fittings (10 & 50) together causing locking tangs 40 to bend and flex radially thereby allowing internal shoulder 42 to ride up and over annular ridge 60, whereby bulbous tip 41 is position within channel 61.

Referring to FIGS. 7 and 8, locking sleeve 70, mounted concentrically about the exterior of first fitting 10, is movable from unlocked position 80 to locked position 82.

As shown in FIG. 7, the locking sleeve is in an unlocked position 80 when radially inward projecting keys 74 are maintained within first circumferential channel 30 at which position the locking sleeve encompasses coupling portion 13 of first fitting 10. When the locking sleeve is in the unlocked position locking tangs 40 are free to bend and expand radially thereby allowing internal shoulder 42 to ride up and over annular ridge 60 as the first and second fitting advance together.

As illustrated in FIG. 8, the locking sleeve is moved from unlocked position 80 to locked position 82 when keys 74 travel along axial slots 29 of collar 28 to become positioned within second circumferential channel 32 whereby the locking sleeve encompasses locking portion 15 of first fitting 10. Once keys 74 are positioned within second circumferential channel 32, locking sleeve 70 is rotated so that keys 74 are no longer in alignment with axial slots 29 thereby preventing the unintended movement of the locking sleeve from a locked to an unlocked position. When the locking sleeve is in the locked position the locking sleeve encompasses locking portion 15 of first fitting 10 such that locking tangs 40 cannot bend and flex radially outward. Thus, internal shoulder 42 is captured behind annular ridge 60 with the first and second fitting (10 & 50) being securely connected. It will be appreciated that locking sleeve 70, internal shoulder 42 and annular ridge 60 cooperate to prevent relative rotation and axial translation of first fitting 10 relative to second fitting 50 thereby maintaining a locked coupling which is designed to prevent inadvertent disassembly of the coupling.

Referring to FIGS. 9 and 10, in order to prevent the unintended movement of locking sleeve 70 from locked position 82 to unlocked position 80, collar 28 is formed with anti-rotation contours 31 disposed at opposing sides 33 of axial slots 29 extending into second circumferential channel 32 whereby, upon advancing locking sleeve 70 from unlocked position 80 to locked position 82, keys 74 translate through the axial slots to travel beyond the axial extreme edge of the collar until the keys are located in the second circumferential channel. The locking sleeve is then rotated about first fitting 10 where the keys slide circumferentially along anti-rotation contours 31. It will be appreciated that the rotation contours act to maintain keys 74 within second circumferential channel 32 by making it difficult to realign the keys with the axial slots 29 because to do so would require a complex motion of the locking sleeve including the combination a axial motion together with circumferential rotation. Thus, the locking sleeve is retained in locked position 82 in such a manner that vibration of the respective fittings cannot inadvertently align keys 74 with axial slots 29 to permit the locking sleeve to move from the locked position back to the unlocked position.

Those skilled in the art will appreciate that the preferred embodiment of the present invention provides visible and tactile feedback of correct installation. Thus, upon installation, an operator can verify that first and second fittings (10 & 50) are properly engaged, whereby frusto-conical tip 68 of the second fitting is firmly seated against corresponding internal countersink 27 of ferrule 24 to provide a leak-proof coupling allowing the flow of fluid therethrough, simply by inspecting the assembly to ensure that internal locking shoulders 42 have expanded up and over annular ridge 60 to position bulbous tips 41 within channel 61. In addition, the operator is provided with tactile feedback that locking sleeve 70 is properly captured in the locked position to prevent unintended movement of the locking sleeve from the locked to the unlocked position. Tactile feedback is provided to the operator as keys 74 translate within axial slots 29 to enter second circumferential channel 32 whereby the locking sleeve is then rotated and keys 74 are guided circumferentially along anti-rotation contours 31.

It will also be appreciated that the preferred embodiment of the present invention is capable of being easily disconnected and subsequently reconnected by an operator to facilitate rapid removal, repair, or replacement of fluid line segments. To disconnect the self-locking coupling device of the present invention locking sleeve 70 is manipulated to rotate keys 74 circumferentially within second circumferential channel 32 along anti-rotation contours 31 until they are realigned with axial slots 29. Once keys 74 are realigned with axial slots 29, the locking sleeve is then moved from locked position 82 to unlocked position 80 with the keys guiding the movement within the axial slots until they reach first circumferential channel 30. With the keys positioned within first circumferential channel 30, the locking sleeve is again rotated, moving the keys away from the axial slots to ensure that the locking sleeve remains in the unlocked position. At this point the first fitting is rotated relative to the second fitting thereby loosening the corresponding internal and external threads sections (17 & 58) to draw the first and second fittings (10 & 50) apart. As the first and second fittings move apart axially, locking tangs 40 bend and flex radially allowing internal locking shoulder 42 to expand back over annular ridge 60 where further loosening of the respective internal and external thread sections disconnect the coupling.

As shown in FIG. 11, an alternate embodiment of the present invention incorporates a second fitting designed to permit rotation of the fitting relative to the conduit to which it is attached. In this embodiment second fitting 90 is formed with a hollow cylindrical body having first end 92 and second end 94. First end 92 is configured with frusto-conical tip 93 which, like the previous embodiment, is designed to engage the inverse conical ramping surfaces of internal countersink 27 of ferrule 24 disposed within first fitting 10. The second fitting is also formed with external thread section 96 adjoining second end 94 which engages corresponding internal thread section 97 of end cap 104. The end cap, formed with central bore 105, retains ferrule 100 at the second end of the fitting. Circumferential weld 108 seals end cap 105 to the second fitting. Ferrule 100 extends through central bore 105 and is disposed at the second end of the second fitting such that the surrounding wall of bore 105 contacts retention flange 102. The outer diameter of the ferrule is sized to closely fit within the inner diameter of bore 105. This relationship permits the body of the ferrule to slide through the bore during assembly where the ferrule is finally retained by contact between retention flange 102 and end cap 104. As the ferrule extends through the end cap the second fitting is free to rotate about the ferrule. Alternatively, the ferrule may be retained within the second end of the second fitting by means of a retention ring as shown and described in connection with the first fitting.

Figure 12:
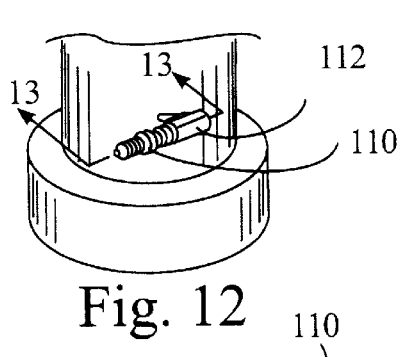
FIG. 12 is a perspective view of an alternate embodiment of the present invention wherein the second fitting is attached to a valve.
Figure 13:
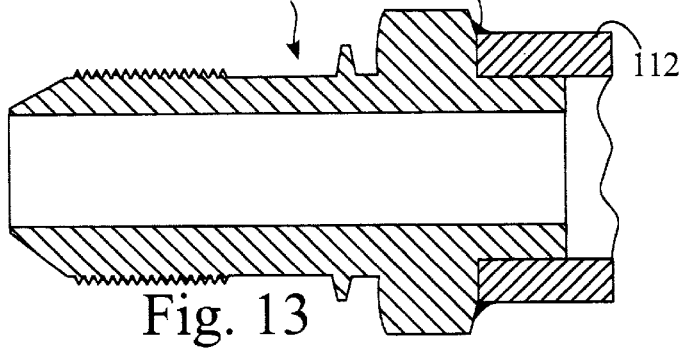
FIG. 13 is an enlarged cross-sectional view taken along line 13—13 of FIG. 12.

Referring to FIGS. 12 and 13, another alternate embodiment of the present invention incorporates second fitting 110 attached to valve stem 112. In this embodiment the second fitting is inserted into the valve stem and the two components are permanently joined by circumferential weld 116.

Figure 14:
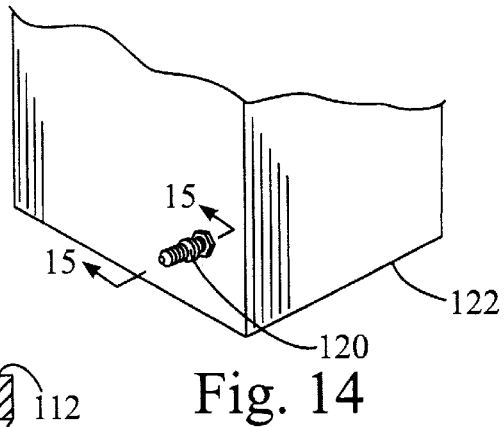
FIG. 14 is a perspective view of an alternate embodiment of the present invention wherein the second fitting attached to a housing.
Figure 15:
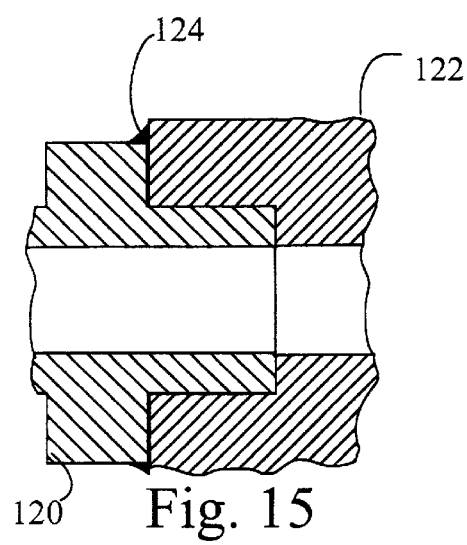
FIG. 15 is an enlarged cross-sectional view taken along line 15—15 of FIG. 14.

Similarly, another alternate embodiment of the present invention, as shown in FIGS. 14 and 15, includes second fitting 120 attached to housing 122. The second fitting and the housing are permanently joined by circumferential weld 124.

Figure 16:
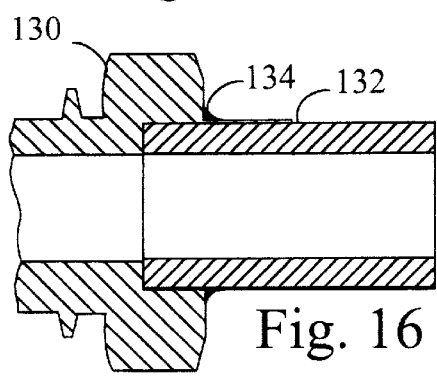
FIG. 16 is an cross-sectional view of an alternate embodiment of the present invention wherein the second fitting is rigidly attached to a second conduit.

Another alternate embodiment of the present invention, as shown in FIG. 16, includes second fitting 130 permanently joined by circumferential weld 134 to conduit 132.

While the preferred embodiment of the present invention has been illustrated and described herein in terms of its use as a self-locking coupling device designed to connect high pressure fluid line segments together in a leak-proof manner, it will be apparent to those skilled in the art that the self-locking coupling device can be used in other instances and applications where a connection between two bodies is required. By way of example, and not of limitation, the self-locking coupling device of the present invention may be utilized to connect electrical conduits, component parts of an assembly, rods, struts, and other forms of secondary structure having connections subject to severe vibration and thermal cycling. It will be appreciated that the present invention may be utilized as a method of connecting two bodies together in severe operational environments while at the same time providing an attachment system which is insusceptible to accidental or inadvertent disassembly.

Those skilled in the art will also appreciate that this invention is not limited to threaded connections between a first fitting and a second fitting. Other means of connecting a first fitting to a second fitting may be utilized to form a coupling without departing from spirit of this invention. Alternative methods of forming a coupling between a first fitting to a second fitting may include, by way of example and shall not be limited to, the use of bayonet connections, pin and groove connections, and the like. In addition, other modifications and improvements may be made to the self-locking coupling device without departing from the scope of the invention.

What is claimed is:

1. A self-locking coupling device, comprising:
   a first fitting with a hollow cylindrical body having a first end rotatably connected to a first conduit, the first fitting having a second end for receiving a second fitting attached to a second conduit, the outer wall of the first fitting having a first circumferential channel adjacent to the first end and a second circumferential channel adjacent to the second end defining therebetween a collar, the collar having at least one axial slot extending therethrough and connecting the first and second circumferential channels, the first fitting formed with a coupling portion adjacent to the first end and a locking portion adjacent to the second end wherein the coupling portion includes an internal thread section and the locking portion includes at least one locking tang attached from the coupling portion and extending to the second end, the at least one locking tang formed with an internal locking shoulder projecting radially inward at the second end;
   the second fitting having a hollow cylindrical body with a first end and a second end, the second end attached to a second conduit, the second fitting having an external thread section adjacent to the first end, the second fitting having an annular ridge disposed between the external thread section and the second end wherein the engagement of corresponding internal and external thread sections advances the respective fittings together and causes the at least one locking tang to bend and flex radially allowing the internal locking shoulder to ride up and over the annular ridge, the first and second fittings being securely connected once the internal locking shoulder has traveled beyond the annular ridge; and
   a locking sleeve with a hollow cylindrical body having at least one radially inward projecting key, the locking sleeve mounted concentrically about the external surface of the first fitting and being movable between an unlocked position and a locked position, the locking sleeve being in the unlocked when the at least one radially inward projecting key is maintained within the first circumferential channel and the at least one locking tang is free to bend and expand radially, the locking sleeve being in the locked position when the at least one radially inward projecting key is maintained within the second circumferential channel and the at least one locking tang is encompassed by the inner diameter of the locking sleeve whereby the at least one locking tang is prevented from bending and expanding radially.

2. A self-locking coupling device as set forth in claim 1, wherein:
   the first fitting is formed with a hex nut adjacent to the first end.

3. A self-locking coupling device as set forth in claim 1, wherein:
   the second fitting is formed with a hex nut adjacent to the second end, the hex nut cooperating with the annular ridge to form annular groove therebetween.

4. A self-locking coupling device as set forth in claim 1, wherein:
   the first end of said first fitting includes a retention ring and a ferrule, the retention ring formed about the inner wall of said first fitting and projecting radially inward, the ferrule having an free end and a captured end, the captured end formed with a retention flange, the ferrule being inserted through the retention ring whereby the free end is connected to a first hose segment and the retention flange is seated against the retention ring such that a first fitting is free to rotate about the ferrule.

5. A self-locking coupling device as set forth in claim 4, wherein:

the first end of said first fitting includes an annular groove and a thrust wire, the annular groove recessed into an inner wall of said first fitting for receiving the thrust wire and cooperating therewith to form the retention ring.

6. A self-locking coupling device as set forth in claim 1 wherein:

the second end of the second fitting includes a retention ring and a ferrule, the retention ring formed about the inner wall of the second fitting and projecting radially inward, the ferrule having a free end and a captured end, the captured end formed with a retention flange, the ferrule being inserted through the retention ring whereby the free end is connected to the second conduit and the retention flange is seated against the retention ring such that the second fitting is free to rotate about the ferrule.

7. A self-locking coupling device as set forth in claim 6, wherein:

the second end of the second fitting includes an annular groove and a thrust wire, the annular groove recessed into the inner wall of the second fitting for receiving the thrust wire and cooperating therewith to form the retention ring.

8. A self-locking coupling device as set forth in claim 1, wherein:

the second end of the second fitting includes an end cap having a central bore, and a ferrule, the ferrule having a free end and a captured end, the captured end having a retaining flange, the ferrule being inserted through the central bore of the end cap whereby the free end is connected to the second conduit and the retention flange is seated against the end cap such that the second fitting is free to rotate about the ferrule.

9. A self-locking coupling device as set forth in claim 8, wherein:

the end cap is attached to the second end of the second fitting with a threaded connection.

10. A self-locking coupling device as set forth in claim 8, wherein:

the end cap is attached to the second end of the second fitting with a welded connection.

11. A self-locking coupling device comprising:

a first fitting with a hollow cylindrical body having a first end rotatably connected to a first conduit, the first fitting having a second end for receiving a second fitting attached to a second conduit, the outer wall of the first fitting having a first circumferential channel adjacent to the first end and a second circumferential channel adjacent to the second end defining therebetween a collar, the collar having at least one axial slot extending therethrough and connecting the first and second circumferential channels, the first fitting formed with a coupling portion adjacent to the first end and a locking portion adjacent to the second end wherein the coupling portion includes an internal thread section and the locking portion includes at least one locking tang attached from the coupling portion and extending to the second end, the at least one locking tang formed with an internal locking shoulder projecting radially inward at the second end;

the second fitting having a hollow cylindrical body with a first end and a second end, the second end attached to a second conduit, the second fitting having an external thread section adjacent to the first end, the second fitting having an annular ridge disposed between the external thread section and the second end wherein the engagement of corresponding internal and external thread sections advances the respective fittings together and causes the at least one locking tang to bend and flex radially allowing the internal locking shoulder to ride up and over the annular ridge, the first and second fittings being securely connected once the internal locking shoulder has traveled beyond the annular ridge;

a locking sleeve with a hollow cylindrical body having at least one radially inward projecting key, the locking sleeve mounted concentrically about the external surface of the first fitting and being movable between an unlocked position and a locked position, the locking sleeve being in the unlocked when the at least one radially inward projecting key is maintained within the first circumferential channel and the at least one locking tang is free to bend and expand radially, the locking sleeve being in the locked position when the at least one radially inward projecting key is maintained within the second circumferential channel and the at least one locking tang is encompassed by the inner diameter of the locking sleeve whereby the at least one locking tang is prevented from bending and expanding radially; and an anti-rotation contour formed at opposing sides of the at least one axial slot and extending into the second circumferential channel whereby upon advancing the locking sleeve from the unlocked to the lock position the locking sleeve is rotated over the rotation contour to retain the at least one radially inward projecting key within the second circumferential channel.

\* \* \* \* \*